United States Patent Office 2,840,532
Patented June 24, 1958

2,840,532

ALUMINA PLATINUM CATALYST AND PREPARATION THEREOF

Vladimir Haensel, Hinsdale, Ill., assignor to Universal Oil Products Company, Des Plaines, Ill., a corporation of Delaware No Drawing. Application July 17, 1953
Serial No. 368,827

6 Claims. (Cl. 252—466)

This invention relates to the manufacture of catalysts and particularly to the manufacture of platinum-containing catalysts. In another embodiment the present invention relates to the use of platinum-containing catalysts prepared by a specific method of procedure.

Platinum-containing catalysts and various methods of manufacture have heretofore been suggested. These catalysts have been of limited commercial acceptance because of the high cost thereof. The present invention is based on the discovery that exceptionally good catalysts may be prepared by the specific methods of preparation to be hereinafter described in detail.

In one embodiment the present invention relates to a method of preparing a catalyst which comprises commingling alumina with a water soluble acidic compound not substantially reactive with the alumina at impregnating conditions, and with an aqueous solution of a platinum compound in an amount to form a final catalyst containing from about 0.01% to about 1% by weight of platinum.

In another embodiment the present invention relates to a method of manufacturing a catalyst which comprises combining a halogen with alumina, commingling therewith a water soluble acidic compound not substantially reactive with the alumina at impregnating conditions, and an aqueous solution of a platinum compound in an amount to form a final catalyst containing from about 0.01% to about 1% by weight of platinum.

In a specific embodiment the present invention relates to a method of manufacturing a catalyst which comprises combining a halogen with a support in an amount of from about 0.1% to about 8% by weight of said support on a dry basis, commingling therewith a water soluble acidic compound not substantially reactive with the alumina at impregnating conditions, and an aqueous solution of a platinum compound in an amount to form a final catalyst containing from about 0.01% to about 1% by weight of platinum, and heating the composite in air at a temperature of from about 500° F. to about 1100° F.

In another specific embodiment the present invention relates to a method of manufacturing a catalyst which comprises combining a halogen with alumina in an amount of from about 0.1% to about 8% by weight of said alumina on a dry basis, forming said aluminum-halogen composite into particles of uniform size and shape, calcining said particles at a temperature of from about 800° F. to about 1400° F., commingling the calcined particles with a solution of an acidic compound not substantially reactive with the alumina at impregnating conditions and a platinum compound in an amount to form a final catalyst containing from about 0.01% to about 1% by weight of platinum, and heating the resultant composite in air at a temperature of from about 500° F. to about 1100° F.

In still another embodiment the present invention relates to a process for reforming a gasoline fraction which comprises subjecting said gasoline fraction to contact at reforming conditions with a catalyst prepared by compositing platinum with a support in the presence of an acidic compound not substantially reactive with the alumina at impregnating conditions.

In a further embodiment the present invention relates to a process for reforming a gasoline fraction which comprises subjecting said fraction to contact at reforming conditions with a catalyst prepared by combining a halogen with alumina in an amount of from about 0.1% to about 8% by weight of said alumina on a dry basis, commingling therewith a water soluble acidic compound not substantially reactive with the alumina at impregnating conditions, and an aqueous solution of a platinum compound in an amount to form a final catalyst containing from about 0.01% to about 1% by weight of platinum.

In another specific embodiment the present invention relates to a process for reforming a straight run gasoline fraction which comprises subjecting said gasoline fraction to contact at a temperature of from about 600° F. to 1100° F., a pressure of from about 50 to about 1000 lbs. per square inch, and a weight hourly space velocity of from about 0.5 to about 20, in the presence of the catalyst as herein set forth.

In still another embodiment the present invention relates to a method of manufacturing a catalyst which comprises compositing platinum with a support in the presence of an acidic compound not substantially reactive with the alumina at impregnating conditions.

It has been found that exceptionally good catalysts are prepared in accordance with the novel features of the present invention. While these catalysts may contain larger concentrations of platinum which may range up to about 10% by weight or more of the alumina, it has been found that exceptionally good catalysts may be prepared to contain from as low as about 0.01% to about 1% by weight of platinum. Catalysts of these low platinum concentrations are particularly preferred in the present invention because of the considerably lower cost of the catalyst, thus enhancing the attractiveness of the catalyst for use in commercial processes.

However, in order to obtain improved results with these low platinum concentrations, it is necessary that a particular type of supporting component be composited with the platinum. It has been found that alumina shows unexpected advantages for use as a supporting component for the low platinum concentration, apparently due to some peculiar association of the alumina with the platinum, either as a chemical combination or as a physical association. Platinum on other supports such as alumina-silica, alumina-titania and alumina-boron oxide also shows catalytic activity and the method of my invention for compositing platinum with alumina may also be used for compositing platinum with these other alumina-containing components but not necessarily with equivalent results.

To further improve these catalysts, it is a preferred feature of the present invention that the final catalyst contains halogen in a specific concentration. It has been found that the presence of halogen within a specific range enhances the activity of the catalyst. It is believed that the halogen enters into some chemical combination or loose complex with the alumina and/or platinum, and thereby seems to improve the final catalyst.

While any of the halogen ions will serve to effect improved results, fluoride ions are particularly preferred, and next in order are the chloride ions, while the bromide and iodide ions are generally less preferred. Mixtures of the halogen may also be used and their concentrations will lie within the ranges herein specified. It is understood that while any of the halogens will serve to effect an improvement they are not necessarily equivalent.

As hereinbefore set forth, the catalyst of the present invention is prepared by a specific method of procedure. It is an essential feature of the present invention that the alumina, either with or without combined halogen, be commingled with a water soluble acidic compound and an aqueous solution of platinum compound in an amount to form a final catalyst containing from about 0.01% to about 1% by weight of platinum. By the use of the acidic compound a homogeneous solution is obtained which will readily penetrate and be uniformly distributed throughout the alumina thereby resulting in an improved catalyst. Catalysts containing a non-uniform distribution of the platinum are not satisfactory apparently due to a peculiar association of platinum and alumina which is required to produce satisfactory catalysts. It appears that a particular spacial arrangement of the platinum in relation to the alumina is necessary in order to obtain satisfactory catalysts. This particularly appears to be the case where the alumina is associated with halogen. This desired arrangement is not achieved when the platinum atoms are grouped too closely to the others or are spaced at too great a distance apart. In any event the use of an acid along with chloroplatinic acid results in a solution which is preferred for use in compositing with the alumina.

Heretofore it has been suggested that a basic compound be added to the platinum-containing solution prior to the compositing with the support. Specifically ammonium hydroxide was added to a solution of chloroplatinic acid and the theory set forth was that the ammonia associated itself with the chloroplatinic acid forming a complex which in turn homogeneously distributed itself throughout the alumina. I have now discovered that when the commingling of the platinum compound with the alumina is performed in an acidic solution, a uniformly impregnated composite results. One explanation, although I do not intend my invention to be limited thereto, is that the presence of the acid tends to keep the chloroplatinic acid solution in an unionized form and, therefore, the platinum compound, instead of associating itself with the surface of the alumina particles, thoroughly impregnates the alumina particles to produce a final catalyst in which the platinum is uniformly distributed throughout the alumina.

The alumina for use in the present invention may be prepared in any suitable manner. A particularly preferred method is to prepare alumina by adding a suitable reagent, such as ammonium hydroxide, ammonium carbonate, etc. to a salt of aluminum such as aluminum chloride, aluminum nitrate, aluminum acetate, etc., in an amount to form aluminum hydroxide which, upon drying is converted to alumina and in the interest of simplicity, the aluminum hydroxide is referred to as alumina in the present specification and claims in order that the percentages are based on the alumina free of combined water. It has been found that aluminum chloride is generally preferred as the aluminum salt, not only for convenience in subsequent washing and filtering procedures, but also because it appears to give best results.

After the alumina has been formed, it is generally washed to remove soluble impurities. Usual washing procedures comprise washing with water, either in combination with filtration or as separate steps. It has been found that filtration of the alumina is improved when the wash-water includes a small amount of ammonium hydroxide. The severity of washing will depend upon the particular method employed in preparing the catalyst. In one embodiment of the invention the alumina is thoroughly washed with a suitable amount of water and preferably water containing ammonium hydroxide to reduce the chlorine content of the alumina to below about 0.1%. In another embodiment of the invention this washing may be selective to retain chloride ions in an amount of from about 0.2% to about 8% by weight of the alumina on a dry basis. In general, it is preferred to wash the alumina thoroughly and if it is desired to add chlorine, it is added as a separate step because better control of the amount of chlorine is obtained in this manner.

In some cases it is desirable to prepare the catalyst in the form of pills of uniform size and shape and this may readily be accomplished by grinding the partially dried alumina cake with a suitable lubricant such as stearic acid, rosin, graphite, etc. and then forming the pills in any suitable pelleting or extrusion apparatus. The halogen may be added before or after forming the alumina into particles of uniform size and shape. In still another embodiment the halogen and platinum addition may be effected prior to forming the composite into particles of uniform size and shape.

Alumina spheres may be continuously prepared by passing droplets of an alumina sol into an oil bath maintained at an elevated temperature and retaining the droplets in said oil bath until the droplets set to gel spheres. The spheres are continuously withdrawn from the oil bath and immediately thereafter aged prior to being contacted with water or aqueous solutions. The spheres may then be dried and calcined at a temperature of from about 500° F. to 1400° F. or more.

Regardless of the stage of catalyst preparation at which the halogen is added, the halogen may be incorporated therein in any suitable manner. However, the halogen must be added in a form which will readily react with the alumina in order to obtain the desired results and also must not leave undesired deposits in the catalyst. A preferred method of adding the halogen is in the form of an acid such as hydrogen fluoride, hydrogen chloride, hydrogen bromide and/or hydrogen iodide. Hydrogen fluoride is preferably added as an aqueous solution for ease in handling and for better control of the specific amount to be added. Another satisfactory source to be used for adding the halogen is the volatile salts, such as ammonium fluoride, ammonium chloride, etc. The ammonium ions will be removed during the subsequent heating of the catalyst and, therefore, will not leave undesirable deposits in the catalyst. In still another method, the halogen may be added as fluorine, chlorine, bromine or iodine, but in view of the fact that the halogens normally are more difficult to handle it is generally preferred to utilize them in the form of a solution for ease in handling. In some cases, the inclusion of certain components will not be harmful but may be beneficial and in these cases the halogen may be added in the form of suitable salts.

The concentration of halogen ion in the finished catalyst will be within the range of from about 0.1% to about 8% by weight of the alumina on a dry basis. The fluoride ion appears to be more active and, therefore, will be used within the range of from about 0.1% to about 5% by weight of the alumina on a dry basis. The chloride concentration will usually be from about 0.2% to about 8% by weight of the alumina on a dry basis. It has been found that halogen concentrations below these lower limits do not give the desired improvement and, on the other hand, concentrations of halogen above the upper limits adversely effect the selectivity of the catalyst, thus catalyzing side reactions to an extent greater than desired.

The alumina after washing and filtration is generally recovered as a wet cake. In one embodiment of the invention the wet cake, either with or without being made into a slurry with water, is commingled with a platinum compound-acidic compound solution. In another embodiment of the invention the alumina may be dried, formed into particles of definite size and shape, and calcined prior to commingling with a platinum compound-acidic compound solution.

The solution of platinum compound and acidic compound may be prepared in any suitable manner. Chloroplatinic acid is the preferred platinum compound to be used in accordance with the present invention because of its ready availibility and lower cost. It is understood that other platinum compounds may be used in accordance with the present invention, however not necessarily with equivalent results. As hereinbefore set forth the amount of platinum compound utilized is preferably controlled so that the final catalyst contains from about 0.01% to about 1% by weight of platinum.

Any suitable acidic compound that is not substantially reactive with the alumina at impregnating conditions may be used within the scope of the present invention. The acidic compound preferably is one that is not substantially reactive with the alumina at any of the conditions in which it is in contact with the alumina during the preparation of the catalyst. In some cases only certain concentrations of the acidic compound are substantially reactive with the alumina and these concentrations should not be used. An acidic compound may be used however, when it is reactive with the alumina, if the resulting product or residue is not too harmful to the catalyst and/or if the resultant product or residue is removed in a further treatment, such as washing or calcination, and/or if the formation of the resultant product or residue does not harm the final catalyst. It is preferred, however, that the acidic compound be water soluble and substantially unreactive with the alumina. In most cases it may be removed by washing or by calcination. Most concentrations of aqueous solution of hydrogen halides and specifically hydrogen fluoride and/or hydrogen chloride are reactive with the alumina and, therefore, such concentrations are not to be used as the acidic compound of my invention. Likewise higher concentrations of sulfuric acid, especially at elevated temperatures are reactive with the alumina and these higher concentrations and elevated temperatures are not to be used when employing sulfuric acid. Usually the impregnation is done at a concentration and temperature such that the sulfuric acid is not reactive with the alumina and at these concentrations and temperatures it may be used.

Preferred acidic compounds comprise inorganic compounds such as nitric acid, sulfuric acid, phosphoric acid, and aluminum nitrate. Other suitable acids include organic acids such as acetic acid, oxalic acid, formic acid, propionic acid, and more generally include acids and acid salts which are more acidic than chloroplatinic acid or any other platinum-containing compound that is selected. Mixtures of said acid compounds may also be used within the scope of this invention.

The amount of acidic compound required will vary with the particular acidic compound and with the particular solution utilized. In general only a small amount of acidic compound will be required and usually will be in amount sufficient to lower the pH of the platinum containing solution to below 2.5 and preferably below 2.0.

The amount of acidic compound that is to be added may be measured by the amount necessary to lower the impregnating solution to a specified pH. The preferred method is by measuring a stoichiometric amount of acidic compound that is added to the platinum-containing solution and/or to the halogen-containing solution and/or to the platinum and halogen containing solution. The concentration of acidic compound will be within the range of from about 0.001 to about 5.0 molar with respect to said acidic compound and preferably from about 0.005 to about 3.0 molar. Concentrations below this wider range are too weak to be effective and concentrations above this range often are too reactive with the alumina.

The solution of platinum and acidic compound may be composited with the alumina in any suitable manner. When the solution is to be composited with the alumina in a wet condition, this is readily accomplished by adding the solution to the alumina and thoroughly mixing the same to obtain uniform distribution, after which the composite is washed and the washed material is dried at a temperature of from about 200° F. to about 500° F. for a period of from about 2 to 24 hours or more. The addition of the acidic compound may be followed by the addition of the platinum compound or they may be added simultaneously. When particles of irregular size and shape are desired, the dried material may be ground and then calcined at a temperature of from about 500° F. to about 1100° F. for a period of from about 2 to 12 hours or more. On the other hand, when particles of uniform size and shape are desired, a suitable lubricant such as stearic acid, rosin, hydrogenated coconut oil, graphite, etc. is added to the dried material and then it is formed into particles of uniform size and shape by any suitable method such as pelleting, extrusion, etc. The particles are then calcined at a temperature within the range as hereinbefore set forth.

In a preferred embodiment of the invention the alumina, prior to commingling with the other components, is formed into particles of definite size and shape. This is accomplished in substantially the same manner as hereinbefore set forth but, before the platinum is composited with the alumina, the alumina particles may be calcined at a somewhat higher temperature which may range from about 800° F. to about 1400° F. Commingling of the platinum compound-acidic compound solution may be accomplished in any suitable manner including soaking the alumina pills in the solution and either draining-off the excess solution or heating to remove the volatilizable materials. Another suitable method is by dipping the alumina particles in the solution. In any event the alumina is contacted with the solution for a sufficient period of time to obtain uniform distribution of the solution throughout the alumina after which the composite may be dried at a temperature of from about 200° F. to about 500° F. for a period of from about 2 to 24 hours or more and then calcined at a temperature of from about 500° F. to about 1100° F. for a period of from about 2 to 12 hours or more. In another embodiment the alumina is combined with a halogen and the alumina-halogen composite may be treated as hereinabove set forth. The calcination is preferably effected in the presence of air or other oxygen-containing gas. In another embodiment of the invention the calcination may comprise a two-stage method in which it is first calcined in the presence of hydrogen and then followed by calcination in air or the reverse procedure may be employed.

In some cases the lubricant will be removed during the high-temperature heating. In other cases, as for example when graphite is used as the lubricant, the separate high temperature heating step may be omitted and the effective heat treatment of the catalyst may be obtained in the plant before or during processing of the hydrocarbon.

The improved catalyst of the present invention may be employed in any process for which platinum is a catalyst. The improved catalyst is particularly effective for reforming operations. The term "reforming" is well known in the petroleum industry and refers to the treatment of gasoline fractions to improve the anti-knock characteristics thereof. The petroleum fraction that is upgraded in reforming may be a full boiling range straight run gasoline having an initial boiling point with the range of from about 50° F. to about 100° F. and an end boiling point within the range of from about 350° F. to about 425° F. It may also be a natural gasoline as obtained from the refining of natural gases, or it may be any selected fraction of the natural gasoline. The natural gasoline or the natural gasoline fraction will have an initial boiling point and an end boiling point substantially the same as that of the gasoline hereinbefore described. In the reforming process the gasoline fraction that is selected usually is the higher boiling fraction, commonly referred to as naphtha, and generally will have an initial boiling point of from about 150° F. to about 250° F. and an end boiling point within the range of from about 350° F. to about 425° F. The catalyst of the present invention may also be applied to the reforming of cracked gasoline or mixtures of cracked and straight run and/or natural gasoline. Reference to gasoline in the present specification therefore means a full boiling range gasoline or any fraction thereof and also that the gasoline fraction may contain components boiling above the gasoline range.

In the reforming process there are four major reactions. The first is an aromatization reaction in which naphthene hydrocarbons are converted to aromatics. The second is a dehydrocyclization reaction in which the straight chain or slightly branched chain paraffins are cyclized to form aromatics. Third is an isomerization reaction in which straight chain or slightly branched chain paraffins are converted to more branched chain paraffins. This reaction occurs as a result of a strain put upon a carbon to carbon bond so that there is a shift of a carbon atom in the molecule to form a more branched chain molecule. In this specific reaction there is no change of molecular weight. The reaction may also be characterized as increasing the number of methyl groups in the hydrocarbon molecule. The fourth is a cracking reaction in which the heavier straight chain or slightly branched chain paraffins, which have low antiknock characteristics, are converted to lighter straight chain or branched chain paraffins which have higher antiknock characteristics. When this last reaction is conducted in the presence of hydrogen, the unsaturated hydrocarbon which is formed as a result of the cracking operation, is saturated to the paraffin by reaction with hydrogen in the presence of the reforming catalyst. The cracking or splitting of the carbon to carbon bond is one of the more important reactions in a successful reforming process. It is necessary that the splitting of the carbon to carbon bond be controlled so that there is no unnecessary formation of normally gaseous products. For example, it would be possible to crack a $C_{10}$ hydrocarbon to form ten molecules of methane, however, unless methane is the specifically desired product, it would be uneconomical in a reforming process to crack the $C_{10}$ hydrocarbon to form methane. It is more desirable to crack a $C_{10}$ hydrocarbon so that two molecules of pentane are formed and it would be still more desirable if, during the reaction, isomerization would be simultaneously take place so that the product obtained would be isopentane. It is an object of the present invention to provide a catalyst wherein the cracking activity is controlled and selective so that excess amount of normally gaseous products are not produced in a reforming process.

Uncontrolled or non-selective cracking results in the more rapid formation of larger quantities of coke or carbonaceous matter which deposits on the catalyst and decreases or destroys its activity to catalyze the desired reactions. This in turn results in shorter processing cycles or periods with the necessity of more frequent regeneration of the catalyst by burning the carbonaceous products therefrom, or should the catalyst activity be destroyed it will be necessary to shut down the unit to remove the old catalyst and replace it with new catalyst.

Another important feature in a successful reforming process is the matter of hydrogen production and consumption. Investigation has shown that the presence of hydrogen in the reforming zone further tends to decrease the amount of carbonaceous deposit on the catalyst. In view of the fact that the cost of hydrogen is quite high, it is essential that there be no net consumption of hydrogen or, in other words, at least as much hydrogen must be produced in the process as is consumed therein.

While the catalyst of the present invention is particularly suitable for the reforming of gasoline, it is understood that this novel catalyst may be utilized for the conversion of other hydrocarbon fractions. Thus the catalyst may be used for the dehydrogenation of selected hydrocarbon fractions such as naphthenes to produce aromatics including specifically the dehydrogenation of cyclohexane to benzene, methylcyclohexane to toluene, ethylcyclohexane to ethylbenzene, etc., the dehydrogenation of paraffins to produce the corresponding olefins, including specifically dehydrogenation of butane to butene, pentane to pentene, hexane to hexene, etc., the dehydrogenation of mono-olefins to produce the corresponding diolefins including specifically dehydrogenation of butene to butadiene, pentene to pentadiene, etc. The catalyst may also be utilized to effect dehydrocyclization reactions including specifically the conversion of normal hexane to benzene, normal heptane to toluene, etc. The catalyst may also be used for effecting isomerization reactions including the isomerization of normal or mildly branched chain paraffins, the isomerization of alkyl cyclic compounds to isomers thereof, including the isomerization of normal or mildly branched chain paraffins, the isomerization of alkyl cyclic compounds to isomers thereof, including the isomerization of methylcyclopentane to cyclohexane, ethylcyclopentane to methylcyclohexane, etc., the isomerization of alkyl benzenes, etc. Furthermore, the catalyst may be used for effecting hydrogenation reactions including non-destructive hydrogenation, as for example, the hydrogenation of butene to butane, pentene to pentane, aromatics to cycloparaffins, etc., and destructive hydrogenation of heavier oil to gases and/or gasoline fractions. In still another embodiment the catalyst of the present invention may be used for effecting oxidation of hydrocarbons to form the corresponding oxides, such as the oxidization of normal butene to normal butyl alcohol. The catalysts are also very effective for desulfurizing sulfur-containing fractions. The desulfurization may be effected in the presence or absence of hydrogen. In the desulfurization reaction the organic sulfur compounds such as mercaptans or thiophenes are converted to hydrogen sulfide which may be stripped out in subsequent operations.

As herein set forth the catalyst of the present invention is particularly suitable for use in the reforming of gasoline or fractions thereof. The exact operating conditions depend upon the character of the charging stock as well as the activity of the catalyst being used. However, the conditions usually will be in the following ranges: Temperatures from about 600° F. to about 1100° F., a pressure of from about 50 to about 1000 p. s. i. or more, a weight hourly space velocity (defined as the weight of oil per hour per weight of the catalyst in the reaction zone) of from about .5 to about 20 or more. The reforming is preferably effected in the presence of hydrogen which may be introduced from an extraneous source or recycled within the process. In one embodiment of the process sufficient hydrogen will be produced in the reforming reaction to furnish the hydrogen required in the process and, therefore, it may be unnecessary to either introduce hydrogen from an extraneous source or to recycle hydrogen within the process. However, it usually will be preferred to introduce hydrogen from an extraneous source at the beginning of the operation and to recycle hydrogen within the process in order to be assured of a sufficient hydrogen atmosphere in the reaction zone. The hydrogen present in the reaction zone will be within the range of from about 0.5 to about 20 mols of hydrogen per mol of hydrocarbon. In some cases the gas to be recycled will contain hydrogen sulfide introduced with the charge or liberated during the reaction and it is within the scope of the present invention to treat the hydrogen-containing gas to remove hydrogen sulfide or other impurities before recycling the hydrogen within the process.

Other selected processing conditions are required depending upon the particular reaction desired. For example, for dehydrogenation of normal butane the temperature should be within the range of from about 800° F. to about 1100° F., the pressure from about atmospheric to about 50 lbs. per square inch, and the gaseous hourly space velocity from about 200 to about 5000.

For hydrogenation reactions the temperature may range from atmospheric to about 500° F., the pressure from about 100 to about 3000 pounds per square inch or more, and the weight hourly space velocity from about 0.5 to 5.

Processes using the catalyst of the present invention may be effected in any suitable equipment. The finished catalyst may be deposited as a fixed bed in a reactor and the hydrocarbons to be treated are passed therethrough in either upward or downward flow. The catalyst may be used in a fluidized type of operation in which the catalyst and hydrocarbons are maintained in a state of turbulence under hindered settling conditions, or a fluidized-fixed bed type of operation may be used in which the catalyst and hydrocarbons are maintained in a state of turbulence under hindered settling conditions but where catalyst is not withdrawn from or introduced into the reaction zone during the processing cycle. The catalyst may also be used in the moving bed type of process in which the catalyst and hydrocarbons are passed either in concurrent or countercurrent flow through a reaction zone, and the catalyst may also be used in the suspensoid type of operation in which the catalyst and hydrocarbons are passed as a slurry through the reaction zone. The reactants from any of the hereinbefore mentioned reaction zones are normally subjected to a further treatment, such as the stabilization of the product to separate normally gaseous paraffins therefrom to obtain a final reformed product of the desired volatility and vapor pressure.

The following examples are given to further illustrate the novelty and utility of the present invention, but are not given for the purpose of unduly limiting the generally broad scope of the present invention.

EXAMPLE I

A catalyst was prepared in accordance with the present invention by adding ammonium hydroxide to aluminum chloride hexahydrate to form aluminum hydroxide. The resultant aluminum hydroxide was washed thoroughly in order to reduce the chloride content to below 0.1% by weight on a dry basis. This washing entailed 6 separate washes with large amounts of water containing a small amount of ammonium hydroxide and a final wash with water with intervening filtering between the washes. An aqueous solution of hydrogen fluoride was added to the washed alumina in an amount of about 0.3% by weight of the alumina on a dry basis. The alumina-fluorine composite was dried at a temperature of about 340° F. for 8 to 10 hours in order to reduce the moisture content to about 30%. The partially dried alumina was ground, Sterotex added as a lubricant, and then pilled in a Stokes pelleting machine to form cylindrical pills of 1/8" x 1/8" in size. The pills were then calcined in air at a temperature of about 932° F. for six hours to remove the lubricant and then further calcined at a temperature of about 1200° F. for three hours.

5 ml. of a concentrated nitric acid was added to 45 ml. of a dilute solution of chloroplatinic acid containing 0.15 gram of platinum. This solution was added to a portion of the above prepared alumina-fluorine pills in an amount so that the final catalyst contained 0.3% by weight of platinum. The mixture was then evaporated to dryness and the pills subsequently calcined in air at a temperature of about 932° F. for approximately three hours. This catalyst is referred to as catalyst A. Catalyst B was prepared in substantially the same manner except that instead of 5 ml. of concentrated nitric acid, 4.18 grams of $Al(NO_3)_3 9H_2O$ were used.

Catalysts A and B were used for reforming a Mid-Continent naphtha having a boiling range of from about 230° F. to 413° F. and F-1 clear octane number of 34.0, at an average catalyst temperature of 860° F., a pressure of 500 pounds per square inch, a liquid hourly space velocity of 2.04, and a hydrogen to hydrocarbon mol ratio of about 3.0. The analysis of the charge stock and reformed product are shown in Table I below:

*Table I*

| | Charge | Catalyst A | Catalyst B |
|---|---|---|---|
| Reid vapor pressure | | 4.9 | 4.8 |
| Percent 212+ loss of Engler distillation | | 11.5 | 14.0 |
| Dispersion @ 20° C | 81.4 | 111.2 | 112.3 |
| F-1 clear octane number | 34.0 | 82.8 | 83.5 |

It will be noted from the above data that the use of an acidic compound in the impregnating solution produced a very effective reforming catalyst. On inspection of the catalyst pills showed that the platinum was uniformly distributed throughout the particles.

EXAMPLE II

Catalysts were prepared in substantially the same manner except that acetic acid was used in the impregnating solution for catalyst C and oxalic acid was used in the impregnating solution for catalyst D. Both catalyst C and catalyst D are very effective reforming catalysts and the platinum was unformly distributed through the catalyst particles.

I claim as my invention:

1. In the compositing of platinum with alumina, the step which comprises impregnating the alumina with a homogeneous aqueous solution of a water-soluble platinum compound and an acidic compound selected from the group consisting of nitric acid, sulfuric acid, phosphoric acid, aluminum nitrate, acetic acid, oxalic acid, formic acid, and propionic acid in an amount to impart to the solution a pH value below 2.5.

2. In the compositing of platinum with alumina, the step which comprises impregnating the alumina with a homogeneous aqueous solution of a water-soluble platinum compound and nitric acid in an amount to impart to the solution a pH value below 2.5.

3. In the compositing of platinum with alumina, the step which comprises impregnating the alumina with a homogeneous aqueous solution of a water-soluble platinum compound and sulfonic acid in an amount to impart to the solution a pH value below 2.5.

4. In the compositing of platinum with alumina, the step which comprises impregnating the alumina with a homogeneous aqueous solution of a water-soluble platinum compound and aluminum nitrate in an amount to impart to the solution a pH value below 2.5.

5. In the compositing of platinum with alumina, the step which comprises impregnating the alumina with a homogeneous aqueous solution of a water-soluble platinum compound and acetic acid in an amount to impart to the solution a pH value below 2.5.

6. In the compositing of platinum with alumina, the step which comprises impregnating the alumina with a homogeneous aqueous solution of a water-soluble platinum compound and oxalic acid in an amount to impart to the solution a pH value below 2.5.

References Cited in the file of this patent

UNITED STATES PATENTS

| | | |
|---|---|---|
| 2,331,915 | Kirkpatrick | Oct. 19, 1943 |
| 2,479,110 | Haensel | Aug. 16, 1949 |
| 2,611,749 | Haensel | Sept. 23, 1952 |
| 2,636,863 | Haensel | Apr. 28, 1953 |
| 2,739,946 | Guyer et al. | Mar. 27, 1956 |
| 2,753,310 | Riedl | July 3, 1956 |
| 2,769,688 | Milliken et al. | Nov. 6, 1956 |